No. 855,937. PATENTED JUNE 4, 1907.
A. T. COLLIER.
WORM GEARING.
APPLICATION FILED SEPT. 22, 1906.

Witnesses:
C. D. Kesler
H. B. Keeler

Inventor
Arthur T. Collier
By
James L. Norris

UNITED STATES PATENT OFFICE.

ARTHUR THOMAS COLLIER, OF ST. ALBANS, ENGLAND.

WORM-GEARING.

No. 855,937.　　　　Specification of Letters Patent.　　　　Patented June 4, 1907.

Application filed September 22, 1906. Serial No. 335,712.

*To all whom it may concern:*

Be it known that I, ARTHUR THOMAS COLLIER, a subject of the King of Great Britain, residing at St. Albans, England, have invented certain new and useful Improvements in Worm-Gearing, of which the following is a specification.

This invention relates to worm-gearing which may be advantageously employed in driving self-propelled vehicles, cranes and other apparatus in which smoothly running reduction gearing is required.

An important feature of the improved worm-gearing consists in that the teeth of the worm-wheel are formed by balls which are arranged to turn freely in hemispherical recesses in the worm-wheel and are retained in position in any suitable manner, for example, by means of an annular guard interrupted only by the worm, or each ball is retained in its recess by one or more lateral projections on the wheel, these projections being arranged in such positions as to clear the thread or threads of the worm. There may be one, two or more annular series of recesses in the worm-wheel so that each of the ball-teeth will consist of one, two or more balls arranged side by side. Worm wheels in which the teeth consist of two or more balls arranged side by side are not however applicable to globoidal worms but only to worms in which the thread or threads lie in a cylindrical surface.

The worm is preferably made globoidal, *i. e.*, with its pitch uniform along a line corresponding to the pitch circle of the worm-wheel and shaped to fit the worm-wheel and is of such length as to engage with two or more ball-teeth. By this means, two or more ball-teeth will always fill the spaces in the worm and will divide the driving strain between them.

Figure 1:
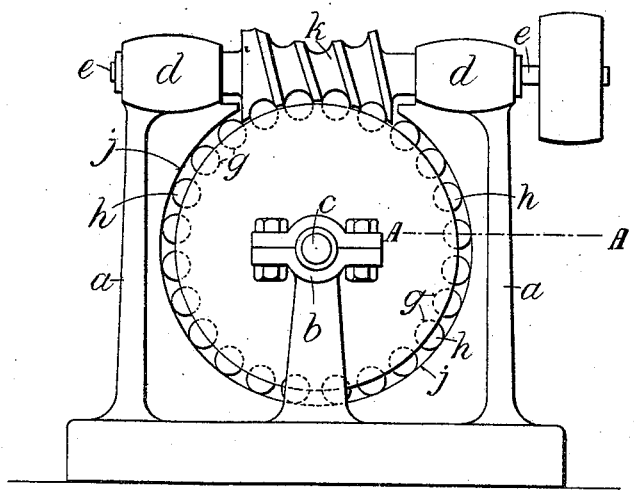
Figure 3:
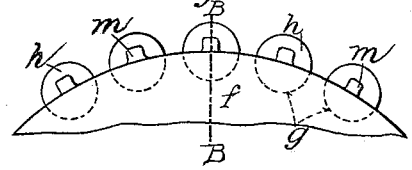
Figure 2:
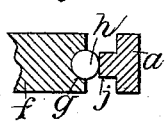
Figure 5:
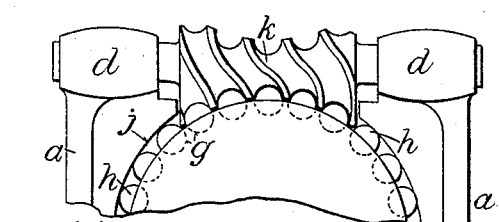
Figure 6:
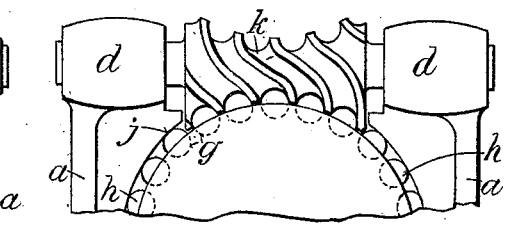

In the accompanying drawings Figure 1 is a side elevation of a worm and worm-wheel constructed according to the said invention. Fig. 2 is a section on the line A A, Fig. 1. Fig. 3 is a side elevation, and Fig. 4 a section on the line B B, Fig. 3, showing a modification. Figs. 5 and 6 are side elevations of parts of worm gear mechanism with two and three threads respectively.

*a* is a frame which is provided with bearings *b*, *b* to receive the worm-wheel shaft *c* and with bearings *d*, *d* to receive the worm-shaft *e*. The worm-wheel *f* has a cylindrical periphery in which hemispherical recesses *g*, *g* are arranged at short distances apart, these recesses receiving balls *h*, *h* which can turn freely therein and are preferably made of steel. The balls *h*, *h* are held in position in their recesses by means of an annular guard *j* and by the worm *k* which together complete the circumference of the wheel *f*.

The worm *k* is made in the form of a figure of revolution having for its generating line an arc of a circle which has the same radius as the pitch line of the worm-wheel and which lies in a plane extending through the axis of the worm. The pitch of the thread or threads of the worm is made uniform along its arc-shaped generating line so as to enable it to engage perfectly with several balls *h*, *h* on the wheel *f*, which thus divide the driving strain between them. For this purpose, the worm-thread is cut by a tool or tools on a frame which is capable of turning about an axis arranged at the same distance from the axis of the worm as that at which the axis of the worm-wheel is to be afterward mounted and the frame and worm-blank are rotated at the necessary relative speeds to produce a worm of the desired pitch. Means can be provided for feeding the tool forward as required or, in cases where a number of tools are arranged in the said frame, the said tools may be of suitable lengths and shapes to act successively on the blank and complete the formation of the worm in one revolution of the said frame.

Figure 4:
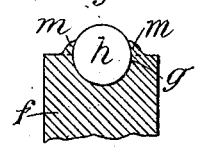

In the modification shown in Figs. 3 and 4, the balls *h*, *h* are retained in their recesses *g*, *g* by means of projections *m*, *m* which are arranged at the sides of the wheel *f* and are of such width and are set at such an angle as to clear the thread or threads of the worm *k*. With this arrangement, the annular guard *j* can be dispensed with.

In Figs. 5 and 6, mechanisms are shown in which the worm is made with two and three threads respectively so as to obtain different velocity-ratios.

What I claim is:—

1. Worm-gearing comprising a worm wheel having in its periphery a series of recesses each adapted to coact with substantially a hemishpere of a ball-tooth, ball-teeth turning freely in all directions in said recesses, a worm engaging with substantially the other hemispheres of said teeth successively, and means for retaining said teeth in said recesses when out of engagement with said worm.

2. Worm-gearing comprising a worm wheel having in its periphery a series of recesses each adapted to coact with substantially a hemisphere of a ball-tooth, ball-teeth turning freely in all directions in said recesses, a worm engaging with substantially the other hemispheres of said teeth successively, and a guide concentric with said worm-wheel for supporting said teeth when they are out of engagement with said worm.

3. Worm-gearing comprising a worm-wheel having in its periphery a series of recesses each adapted to coact with substantially a hemisphere of a ball-tooth, ball-teeth turning freely in all directions in said recesses, a globoid worm having a thread which engages substantially the other hemispheres of said teeth successively and which has an arc-shaped edge substantially fitting the periphery of said worm-wheel between said recesses, and means for retaining said teeth in said recesses when out of engagement with said worm.

4. Worm-gearing comprising a worm wheel having in its periphery a series of recesses each adapted to coact with substantially a hemisphere of a ball-tooth, ball-teeth turning freely in all directions in said recesses, a globoid worm having a groove of substantially semicircular cross-section for engaging the other hemispheres of said teeth successively and which has an arc-shaped edge substantially fitting the periphery of said worm-wheel between said recesses, and an annular guide for supporting said teeth when out of engagement with said worm.

In testimony whereof I have hereunto set my hand in presence of two subscribing witnesses.

ARTHUR THOMAS COLLIER.

Witnesses:
   GEO. HARRISON,
   CONRAD K. FALKENSTEIN.